Aug. 23, 1966     K. STEFFENS     3,268,363

ELECTRIC CELL, PARTICULARLY AN ELECTRIC STORAGE BATTERY

Filed July 24, 1963

Inventor:
Karl Steffens
by John E. Stryker
Attorney

United States Patent Office 3,268,363
Patented August 23, 1966

3,268,363
ELECTRIC CELL, PARTICULARLY AN ELECTRIC STORAGE BATTERY
Karl Steffens, Hagen-Vorhalle, Germany, assignor to Varta Aktiengesellschaft, Hagen, Westphalia, Germany
Filed July 24, 1963, Ser. No. 297,437
Claims priority, application Germany, July 28, 1962, V 22,849
5 Claims. (Cl. 136—6)

This invention involves an electric cell, particularly an electric storage battery, the plate groups of which are so arranged that electrodes of the same polarity are placed parallel to each other and connected in sequence to each other by connecting bars.

Plate groups of this type with the electrodes being folded in a zig-zag arrangement, are known. However, these known designs have a spring-like tendency due to this particular folding arrangement. This becomes especially annoying when the electrodes are to be formed outside of the container. Additional measures and operations are necessary in order to prevent the plates from springing out of place.

It is an object of this invention to produce plate groups for electric cells which will lack the aforementioned disadvantages and are easily manufactured from rows of plates.

Referring to the drawing.

Figure 1:
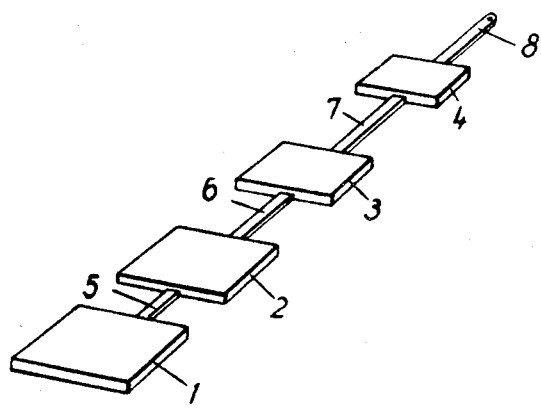
FIGURE 1 is a perspective view showing a row of plates with connecting bars according to the present invention.
Figure 2:
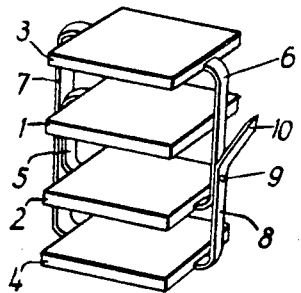
FIG. 2 shows a plate group which has been completed.

Referring to FIG. 1, a row of plates is shown schematically in positions indicated at 1 to 4 respectively disposed in a row with connecting bars 5 to 7 inclusive. The length of the connecting bars are progressively increased so that the second bar 6 of the plate row is somewhat longer than the first bar 5, and the length of the third bar 7 is greater than that of the second bar 6. An unlimited number of electrode plates may be combined into one cell by means of such connecting bars. In assembling the plates of FIG. 1, connecting bars 5–7 are bent in one direction and at an angle of 180° so that the surfaces of the plates 1–4 are parallel one to another, thus forming a coiled stack. According to this invention, the last plate in a row is provided with a tab 8 which is attached to its free edge opposite that connecting bar joining the second and third plates, as for example bar 6 in the drawing. Bars of equal polarity thus cover each other partially as shown in FIG. 2, bars 5 and 7. The bars may be electrically insulated one from another by the application of a lacquer coating or a plastic sheathing. The bars may be placed alongside one another or spot welded together in order to obtain electric conductivity.

As further shown in FIG. 2, the plate group which has been completed according to this invention shows spot welding at 9 of the tab 8 to the bar 6 to prevent the stack from expanding or opening up. Strip-type separators may be adapted to the plate groups in cells equipped with electrode groups according to this invention. In the manufacture of these plate elements, positive and negative plate groups may be covered with one separator strip each by enveloping both surfaces of the first plate of one row with the separator strip. It is also feasible to cover complete plate groups with the separator and to impregnate the electrolyte in the pores of the separator.

Figure 3:
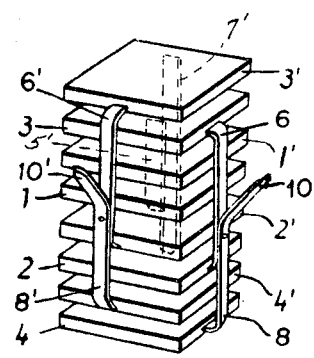
FIG. 3 shows plate groups of both groups arranged in accordance with the present invention.

As shown in FIG. 3, the plates of one polarity are indicated by the numerals 1–4 respectively, and those of the opposite polarity are indicated at 1′–4′, the latter being connected by bars 5′–7′. To assemble the plates as illustrated, the first plates 1, 1′ of the respective plate groups are placed one on top of the other at a suitable angle which is illustrated as a right angle. Each of the bars 5 and 5′ are then bent at an angle of 180° so that the plate 2 will be placed next to the back of plate 2′, and the connecting bars 6–6′ are then bent so that plate 3 is placed adjacent to plate 1′ and plate 3′ adjacent and parallel to plate 3. Thus the sequence of electrodes according to the arrangement shown in FIG. 3 from top to bottom is as follows: 3′, 3, 1′, 1, 2′, 2, 4′, and 4.

The plate groups are thus wound around one another so that the plates of opposite polarity are facing one another. Each plate row must be bent in only one direction according to this invention. Thus the electrode elements shown in FIG. 3, with interlocking positive and negative cells is obtained. As a result of this arrangement, it is possible in one operation to prevent plates or bars of opposite polarity from contacting each, while at the same time insulating the entire electrode element from the container, as is necessary for some applications.

To provide for the absorption of oxygen in hermetically sealed cells, a number of negative electrode plates may be provided with spacers in order to expose their surfaces for oxygen absorption. A number of positive plates may also be kept exposed in the same manner to obtain a gas-tight cell which will be safe during cell reversal.

For the purpose of discharging the cell, snap-on contacts may be attached directly to the first and last plate of the electrode elements which are of opposite polarity due to the stacked arrangement of this invention. It is also feasible to provide the last plates of both rows with polar terminals indicated at 10 and 10′.

Such rows of plates are particularly suited for the production of hermetically sealed prismatic or cylindrical cells having compressed plates. The plate sets are compressed into one unit together with separators and immobilized electrolyte, so that they occupy a minimum space or volume. By spot welding tabs as indicated at 8 and 8′ to the connecting bars of both plate rows, it is possible to keep all plates securely in their closely compact position as well as to prevent the entire electrode element from springing apart.

Following compression of the plates and the fastening of the tabs, the plate rows may be either formed immediately or after they have been placed in the hermetically sealed battery container which may be of the button cell type. This choice of the type of initial treatment is an added advantage.

Another important feature of the electrode elements constructed and arranged according to this invention is the excellent rigidity of the coils during their installation in the battery container. Complete electrode groups such, for example, as those arranged as in FIG. 3 with separators as hereinbefore described form a very solid unit which will withstand considerable pressure in all directions without losing its shape.

I claim:

1. An electric cell, particularly an electric storage battery cell having positive and negative electrode plates arranged in groups of which the plates of at least one group are so arranged that the surfaces of plates of the same polarity are placed parallel one to another and are connected by bars, each of said bars being bent at an angle of 180 degrees, characterized by the fact that the length of the bars connecting a row of plates of the same polarity varies in that each succeeding bar is substantially greater in length than the preceding one, the bars being wrapped around the plates of the group and being secured together at opposite sides of the spaced parallel plates whereby the bars confine the plates against springing apart.

2. An electric cell in accordance with claim 1 characterized by the fact that in at least one of the two groups of plates, at least a portion of selected plates are exposed for the purpose of absorbing oxygen.

3. An electric cell according to claim 1 in which the plates of different polarity are stacked alternately one on top of another with separators between the plates, and the bars connecting the plates of one polarity being disposed at an angle to the bars connecting the plates of the other polarity.

4. An electric cell in accordance with claim 1 in which the electrodes of the same polarity group are characterized by the fact that a plate at an end of the polarity group has a pole terminal which is attached to said plate at its edge opposite a connecting bar extending to another plate of the same group and said pole terminal is electrically and mechanically connected to another connecting bar of the same polarity group.

5. An electric cell in accordance with claim 3 characterized by the fact that each polarity group of plates comprises at least a first and a second plate and in which the first plate of the respective groups are disposed one on top of the other with the bars connecting said first and second plates of the respective groups disposed at an angle of 90° one to the other and the second plates of each group being similarly stacked and having connecting bars angularly disposed at 90° to the bars of the other polarity group.

References Cited by the Examiner

UNITED STATES PATENTS 2,971,999  2/1961  Jacquier _____ 136—111

WINSTON A. DOUGLAS, *Primary Examiner.*

D. L. WALTON, *Assistant Examiner.*